United States Patent [19]

Hildebrecht

[11] 4,250,768

[45] Feb. 17, 1981

[54] CONTROL PEDAL

[75] Inventor: Harold V. Hildebrecht, Cleveland, Ohio

[73] Assignee: Towmotor Corporation, Mentor, Ohio

[21] Appl. No.: 47,850

[22] Filed: Jun. 12, 1979

Related U.S. Application Data

[63] Continuation-in-part of Ser. No. 823,767, Aug. 11, 1977, abandoned.

[51] Int. Cl.³ .................... G05G 1/14; B60K 20/00
[52] U.S. Cl. ..................................... 74/512; 74/474
[58] Field of Search ............... 74/512, 513, 514, 474, 74/478, 520

[56] References Cited

U.S. PATENT DOCUMENTS

| | | | |
|---|---|---|---|
| 2,968,967 | 1/1961 | Ross | 74/474 |
| 2,987,875 | 6/1961 | Torrance | 74/520 |
| 3,691,863 | 9/1972 | Shaffer | 74/478 |
| 3,952,512 | 4/1976 | Feller | 74/474 |
| 3,995,510 | 12/1976 | Yost | 74/512 |
| 4,010,657 | 3/1977 | Amdall | 74/513 |
| 4,010,982 | 3/1977 | Grossart | 74/512 |
| 4,014,218 | 3/1977 | Brandt | 74/513 |
| 4,026,164 | 5/1977 | Mozingo | 74/512 |
| 4,064,769 | 12/1977 | Amdall et al. | 74/478 |

FOREIGN PATENT DOCUMENTS

| | | | |
|---|---|---|---|
| 1805912 | 5/1969 | Fed. Rep. of Germany | 74/512 |
| 1555924 | 3/1975 | Fed. Rep. of Germany | 74/512 |

*Primary Examiner*—Patrick D. Lawson
*Attorney, Agent, or Firm*—Ralph E. Walters

[57] ABSTRACT

A control pedal (106,156) may be operably connected for actuating vehicle functions of acceleration (14), forward direction (16) and rearward direction (18). Different portions (108,158, 114,168,120,174) of the pedal control these functions. Each pedal portion (108, 158,114,168,120,174) is biased to return to an inoperative position. Preferably, the pedal includes a main accelerator portion (108,158), a supplemental forward direction portion (114,168) and a supplemental rearward direction portion (120,174). A microswitch (140a,200,140b,202) is preferably positioned for selective contact by each of the supplemental portions (114,168,120,174) of the pedal (106,156).

6 Claims, 7 Drawing Figures

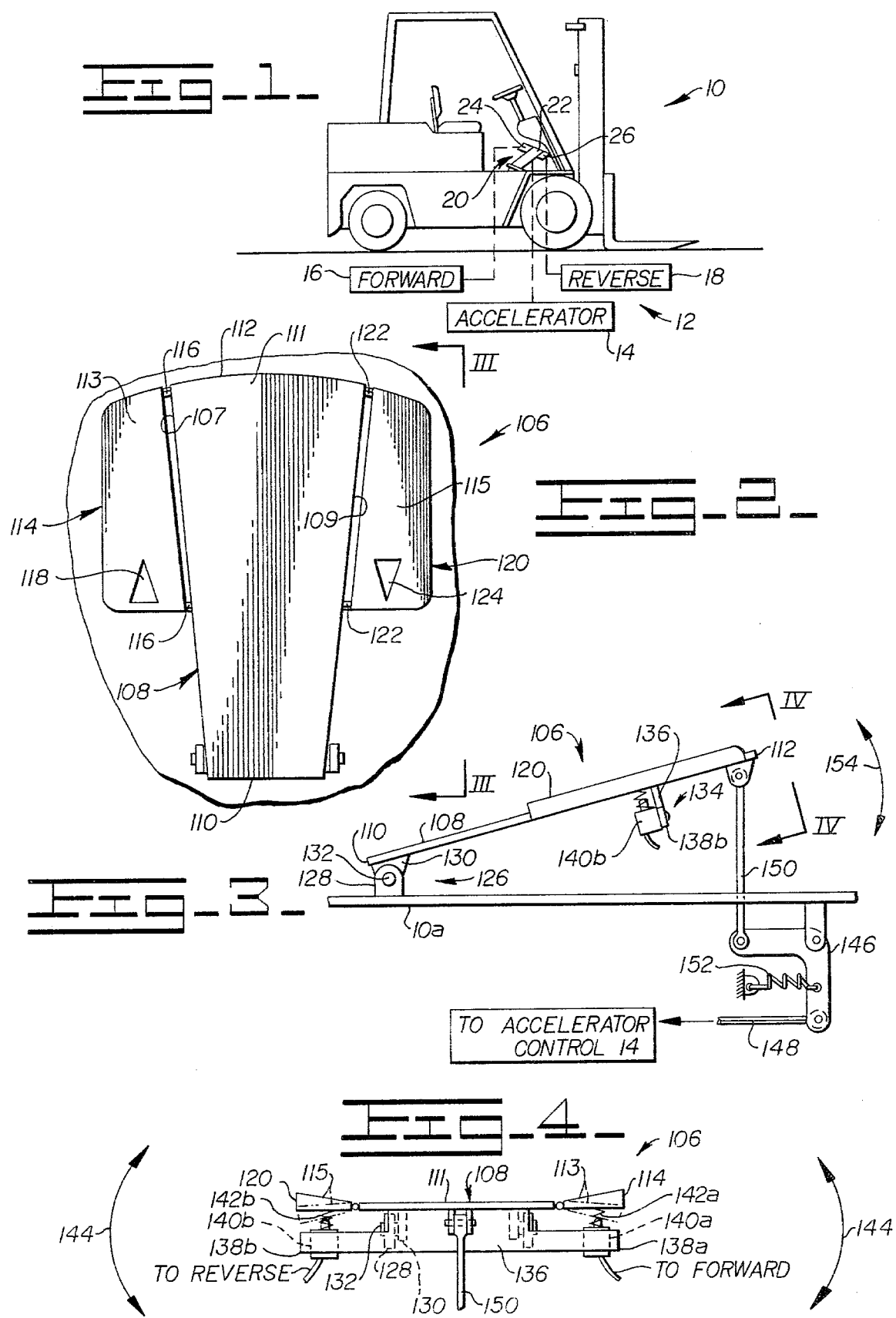

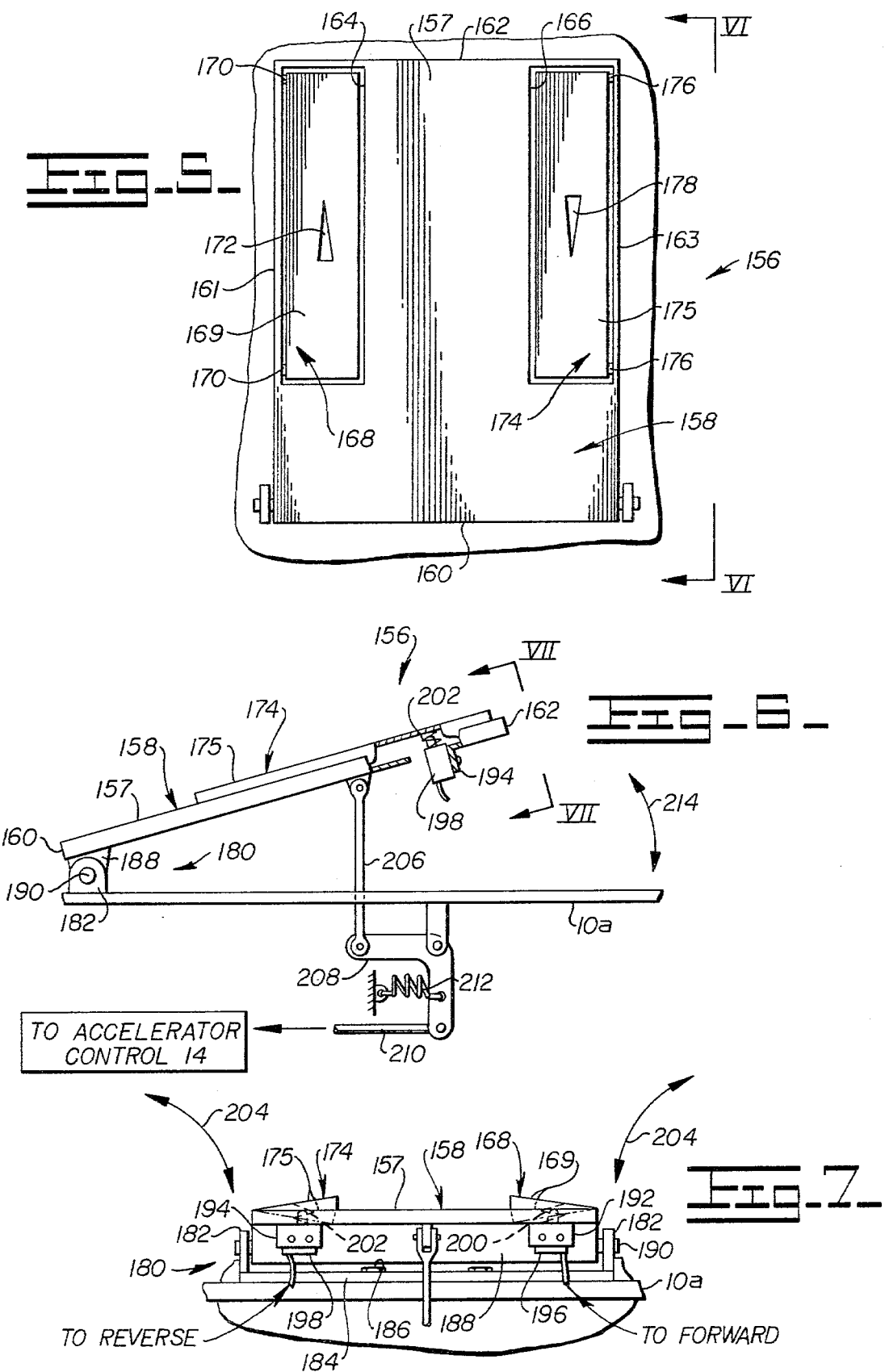

CONTROL PEDAL

CROSS-REFERENCE TO RELATED APPLICATIONS

This is a continuation-in-part of application Ser. No. 823,767 filed on Aug. 11, 1977 now abandoned by Roy M. Gedeon and Harold V. Hildebrecht for VEHICLE CONTROL SYSTEM AND PEDAL THEREFOR.

TECHNICAL FIELD

This invention relates generally to machine elements and mechanisms and more particularly to control lever and linkage systems having multiple control elements moving in multiple planes.

BACKGROUND ART

In the past, it has been found to be desirable to provide a drive system for vehicles, particularly lift trucks, including the capability of shifting between forward and reverse directions by foot operation alone. Additionally, this capability has been combined with the foot operation of the vehicle accelerator.

Accordingly, the prior art has provided a drive system for a lift truck having a single pedal control connected to a control vehicle acceleration mode, a forward direction mode and a reverse direction mode.

Unfortunately, some prior art biases the pedal to return to a forward direction mode rather than a more desirable neutral mode or position.

The prior art has also provided a control pedal which releasably retains the directional control in either of its forward or reverse modes wherein the pedal is also not biased to return to a neutral position.

A further development in the prior art provides for microswitches to extend through openings in a foot pedal. Thus, the operator's foot directly contacts an operating button on the switch which can cause premature wear or damage to the switch.

In view of the above, it would be advantageous to provide a control pedal biased to return to a neutral position, and where microswitches are used, it would be beneficial to avoid direct foot contact with the switch, thus overcoming the problems associated with the prior art.

DISCLOSURE OF THE INVENTION

The present invention is directed to overcoming one or more of the problems as set forth above.

According to the present invention this is accomplished by providing a control pedal including a main pedal portion and first and second supplemental pedal portions. Means are provided for maintaining the first and second portions in a raised position relative to the main portion and also for permitting the supplemental portions to be urged to a position of alignment with the main portion.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF DRAWINGS

In the drawings:

FIG. 1 is a diagrammatic view illustrating a vehicle using the control system of this invention;

FIG. 2 is a plan view illustrating an embodiment of a pedal in accordance with this invention;

FIG. 3 is a side elevational view illustrating the pedal taken along the line III—III of FIG. 2;

FIG. 4 is an end view illustrating the pedal taken along the line IV—IV of FIG. 3;

FIG. 5 is a plan view illustrating an embodiment of a pedal in accordance with this invention;

FIG. 6 is a side elevational view illustrating the pedal taken along the line VI—VI of FIG. 5; and FIG. 7 is an end view illustrating the pedal taken along the line VII—VII of FIG. 6.

BEST MODE FOR CARRYING OUT THE INVENTION

Referring to FIG. 1, a vehicle, for example a fork lift truck, is designated 10 and includes a generally well known vehicle control system 12 including a well known accelerator control 14, a vehicle forward directional control 16 and a vehicle rearward directional control 18.

Generally, a control pedal 20 is mounted on the vehicle and includes first means 22 on the pedal for actuating accelerator control 14. A second means 24 is mounted on the pedal for actuating the vehicle forward directional control 16. Also, a third means 26 is mounted on the pedal for actuating the vehicle rearward directional control 18.

The foregoing generally describes the well known single pedal control concept for actuating acceleration, forward direction and reverse direction.

FIG. 2 illustrates an improved control pedal 106 formed of a suitable cast metal including an elongated main accelerator control portion 108 for actuating accelerator control 14 in the system. Main portion 108 extends from a first end 110 to a second end 112, between a first edge 107 and a second opposite edge 109, and is movable between inoperative (up) and operative (down) positions. Main portion 108 also includes an upper surface 111.

Pedal 106 includes a first supplemental pedal portion 114 similarly formed and pivotally mounted on accelerator control portion 108 between inoperative (up) and operative (down) positions adjacent second end 112 for actuating forward control 16 in the system. First portion 114 includes an upper surface 113. Well known pivot pins 116 can be used to pivotally interconnect forward control portion 114 and main portion 108. If desired, well known resilient torsion springs (not shown) can be mounted with pivot pines 116 for resiliently interconnecting first portion 114 and main portion 108 and for urging the first portion 114 against pivotal movement relative to main portion 108. It is desirable that a directional arrow such as that designated 118, be cast into or formed on first portion 114 as a visual indicator for a vehicle operator.

Pedal 106 also includes a second supplemental pedal portion 120, FIG. 2, similarly formed and pivotally mounted on main portion 108 between inoperative (up) and operative (down) positions adjacent second end 112 opposite first portion 114. Second portion 120 includes an upper surface 115. The first and second portions 114, 120, respectively, are spaced apart by main portion 108. Second portion 120 may be connected for actuating reverse control 18 in the system. Well known pivot pins 122 can be used to pivotally interconnect second portion 120 and main portion 108. If desired, well known resilient torsion springs (not shown) can be mounted with pivot pins 122 for resiliently interconnecting second portion 120 and main portion 108 and for urging second portion 120 against pivotal movement relative to main portion 108. It is desirable that a directional arrow, such as that designated 124, be cast into or formed on reverse portion 120 as a visual indicator for a vehicle operator.

As can be seen by referring to FIGS. 3 and 4, first and second portions 114,120 are attached to accelerator control portion 108 in relatively raised relationship therewith. The purpose of providing such a raised relationship is to provide a reference on the pedal recognizable by the sense of feel to the human foot so that the operator will be able to sense when his foot is engaging only the main portion 108 of pedal 106, or a supplemental portion such as first and second portions 114,120.

A pedal base 126, FIGS. 3 and 4, is mounted on a portion 10a of vehicle 10. Base 126 may be mounted on vehicle 10 by bolts or the like (not shown). Base 126 includes a pair of upwardly extending spaced flanges 128.

Main portion 108 of pedal 106 includes a pair of spaced flanges 130 connected thereto for mating pivotal interconnection to flanges 128 via pin 132. In this manner, pedal 106 is pivotally mounted on base 126.

Switch carrier member 134 is connected to pedal 106 such as by welding or the like to accelerator portion 108 adjacent its second end 112. Carrier 134 includes a generally elongated, horizontally extending support portion 136 having extending switch flanges 138a, 138b at opposite ends thereof.

Switching means such as well known micro-switches 140a, 140b are mounted on switch flanges 138a, 138b adjacent to and for selective contact with first and second portions 114,120, respectively. Switch 140a is connected to actuate the forward control 16 and switch 140b is connected to actuate the reverse control 18 in the well known manner.

Resilient means, such as coil spring 142a, is compressed between switch 140a and first pedal portion 114 for urging the pedal portion 114 against pivotal movement relative to main portion 108. Similarly, resilient means such as coil spring 142b is compressed between switch 140b and second pedal portion 120 for urging the pedal portion 120 against pivotal movement relative to main portion 108. In this manner, springs 142a, 142b act as resilient means urging first and second portions 114,120 toward the inoperative position out of contact with switches 140a,140b, respectively. As a result, the forward and reverse pedal portions are pivotally and resiliently mounted on main portion 108 for up and down movement as indicated by directional arrows 144, FIG. 4. Resilient means 142a, 142b maintain first and second portion 114,120 is a first (up) position (solid lines, FIG. 4) wherein upper surfaces 113,115 are raised relative to upper surface 111 and also permits first and second portions 114,120 to be urged to a second (down) position (dotted lines, FIG. 4) wherein upper surfaces 113,115 are substantially aligned with upper surface 111. Switching means 140a,140b contact first and second portions 114,120 when those portions are urged to the second or down position.

A plurality of well known linkages 146,148,150 are pivotally interconnected between accelerator control 14 and pedal 106. Resilient means such as spring 152 is connected in a well known manner for permitting, but resiliently urging against, pivotal movement of pedal 106 relative to base portion 126. Spring 152 urges main portion 108 toward the inoperative position. As a result, the entire pedal 106, including main portion 108 and first and second portions 114,120, is pivotally mounted on vehicle portion 10a for up and down pivotal movement relative to base 126 as indicated by a directional arrow designated 154, FIG. 3.

The preferred embodiment of FIG. 5 illustrates a control pedal 156 preferably reformed of a cast metal including an elongated main portion 158 for actuating accelerator control 14. Main portion 158 extends from a first end 160 to a second end 162, between a first edge 161 and a second opposite edge 163, and includes openings 164,166 formed therein. Main portion 158 is movable between first inoperative (up) and a second operative (down) positions. Main portion 158 also includes an upper surface 157.

Pedal 156 includes first supplemental portion or forward directional control portion 168 similarly formed and preferably pivotally mounted on main portion 158 between inoperative (up) and operative (down) positions within opening 164 adjacent second end 162 for actuating forward control 16 in the system. First portion 168 includes an upper surface 169. Well known pivot pins 170 are preferably used to pivotally interconnect first portion 168 and main portion 158. If desired, well known resilient torsion springs (not shown) can be mounted with pivot pins 170 for resiliently interconnecting first portion 168 and main portion 158 and for urging the first portion 168 against pivotal movement relative to main portion 158. It is preferred that a directional arrow such as that designated 172 be cast into portion 168 as a visual indicator for a vehicle operator.

Pedal 156 also includes a second supplemental portion or reverse directional control portion 174 similarly formed and preferably pivotally mounted on main portion 158 between inoperative (up) and operative (down) positions within opening 166 adjacent second end 162 opposite forward portion 168. Second portion 174 includes an upper surface 175. The first and second portions 168, 174, respectively, are spaced apart by main portion 158. Second portion 174 may be connected for actuating reverse control 18 in the system. Well known pivot pins 176 are preferably used to pivotally interconnect second portion 174 and main portion 158. If desired, well known resilient torsion springs (not shown) can be mounted with pivot pins 176 for resiliently interconnecting second portion 174 and main portion 158 and for urging second portion 174 against pivotal movement relative to main portion 158. It is preferred that a directional arrow, such as that designated 178, be cast into second portion 174 as a visual indicator for a vehicle operator.

As can be seen by referring to FIGS. 6 and 7, first and second portions 168,174 are preferably attached to main portion 158 in raised relationship therewith. The purpose of providing such a raised relationship is to provide a reference on the pedal recognizable by the sense of feel to the human foot so that the operator will be able to sense when his foot is engaging only the main portion 158 of pedal 156 or a supplemental portion such as first and second portions 168,174.

A pedal base 180 is fixedly mounted on a portion 10a of vehicle 10. Base 180 includes a pair of upwardly extending spaced flanges 182 interconnected by base member 184. Bolts 186 preferably extend through base member 184 and vehicle floor portion 10a for mounting base 180 on vehicle 10.

Main portion 158 of pedal 156 preferably includes an elongated base connector member 188 connected thereto for mating pivotal interconnection with flanges 182 via pin 190. In this manner, pedal 156 is pivotally mounted on base 180.

A plurality of switch carrier flanges 192,194 are preferably formed with main portion 158 adjacent openings 164,166 respectively, adjacent second end 162.

Switch means such as well known micro-switches 196,198 are mounted on switch carrier flanges 192,194 adjacent to and for the selective contact with first and second portions 168,174, respectively. Switch 196 is provided for connection to actuate forward control 16 and switch 198 is provided for connection to actuate reverse control 18 in the well known manner.

Resilient means such as well known coil spring 200 is compressed between switch 196 and first portion 168 for urging the first portion 168 against pivotal movement relative to main portion 158. A similar resilient means 202 is compressed between switch 198 and second portion 174 for urging the second portion 174 against pivotal movement relative to main portion 158. In this manner, springs 200, 202 act as resilient means urging first and second portions 168,174 toward the inoperative position out of contact with switches 196,198, respectively. As a result, the first and second portions are pivotally and resiliently mounted on main portion 158 for up and down movement as indicated by directional arrows 204, FIG. 7. Resilient means 200,202 maintain first and second portions 168,174 in a first (up) position (solid lines FIG. 7) where upper surfaces 169,175 are raised relative to upper surface 157, and also permits first and second portions 168,174 to be urged to a second (down) position wherein upper surfaces 169,175 are substantially aligned with upper surface 157 (dotted lines FIG. 7). Switching means 196,198 contact first and second portions 168,174 when those portions are urged to the second or down position.

A plurality of well known linkages 206,208,210 are pivotally interconnected between accelerator control 14 and pedal 156. Resilient means such as spring 212 is connected in a well known manner for permitting, but resiliently urging against, pivotal movement of pedal 156 relative to base portion 10a. Spring 212 urges main portion 158 toward the inoperative position. As a result, the entire pedal 156, including main portion 158 and first and second portions 168,174, is pivotally mounted on vehicle floor portion 10a for up and down pivotal movement relative to base 180 as indicated by a directional arrow designated 214, FIG. 6.

Industrial Applicability

With the parts assembled as set forth above, the accelerator pedal portion is depressed to the downward or operative position for accelerating the vehicle. When forward vehicle direction is desired, the forward directional pedal portion is depressed downwardly to the operative position simultaneously with the accelerator pedal portion. Thus, forward direction and acceleration in the forward direction are simultaneously controlled. When rearward vehicle direction is desired, the rearward directional pedal portion is depressed downwardly to the operative position simultaneously with the accelerator pedal portion. Thus, rearward direction and acceleration in the rearward direction are simultaneously controlled.

The foregoing has described a control pedal including accelerator, forward and reverse pedal portions each resiliently urged toward an inoperative position.

I claim:

1. A pedal (106,156) comprising:
   a main pedal portion (108,158) having a substantially planar surface (111,157) terminating at a first edge (107,161) and a second edge (109,163) opposite said first edge (107,161);
   a first supplemental pedal portion (114,168) having a substantially planar surface (113,169) and being pivotally mounted on said first edge (107,161);
   a second supplemental pedal portion (120,174) having a substantially planar surface (115,175) and being pivotally mounted on said second edge (109,163); and
   means (142a, 142b, 200, 202) for maintaining said first and second portions (114,168,120,174) in a first position wherein said surface (113,169,115,175) of each of said first and second portions (114,168,120,174) is raised relative to said surface (111,157) of said main portion (108,158), and for permitting each of said first and second portions (114,168,120,174) to be urged to a second position wherein said surface (113,169,115,175) of each of said first and second portions (114,168,120,174) is substantially aligned with said surface (111,157) of said main portion (108,158).

2. The pedal (106,156) of claim 1 including:
   switching means (140a, 196, 140b, 198) for contacting each of said first and second portions (114, 168, 120, 174) when said portions (114, 168, 120,174) are urged to said second position.

3. The pedal (106,156) of claim 1 wherein said first portion (114,168) extends from said first edge (107,161) in a first direction and said second portion extends from said second edge (109,163) in a second direction opposite said first direction.

4. The pedal (106,156) of claim 1 wherein said main portion (108,158) has a first end (110,160) and a second end (112,162), said first and second portions (114,168,120,174) being mounted adjacent said second end (112,162).

5. The pedal (156) of claim 1 wherein said main portion (158) has first and second openings (164,166) formed therein, said first opening (164) being adjacent said first edge (161) and said second opening (166) being adjacent said second edge (163).

6. The pedal (156) of claim 5 wherein said first portion (168) is mounted in said first opening (164) and said second portion (174) is mounted in said second opening (166).

* * * * *